United States Patent
Tofighbakhsh et al.

(10) Patent No.: US 11,025,504 B2
(45) Date of Patent: Jun. 1, 2021

(54) INTENT DESIGN TOOL FOR WIRELESS COMMUNICATION NETWORKS

(71) Applicant: AT&T Intellectual Property I, L.P., Atlanta, GA (US)

(72) Inventors: Mostafa Tofighbakhsh, Cupertino, CA (US); Shraboni Jana, Danville, CA (US); Bogdan Ungureanu, Holmdel, NJ (US); Deva-Datta Sharma, San Ramon, CA (US); Rittwik Jana, Montville, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 127 days.

(21) Appl. No.: 16/529,025

(22) Filed: Aug. 1, 2019

(65) Prior Publication Data

US 2021/0036933 A1  Feb. 4, 2021

(51) Int. Cl.
*H04W 16/18* (2009.01)
*H04L 12/24* (2006.01)
*G06F 3/0482* (2013.01)

(52) U.S. Cl.
CPC ............ *H04L 41/22* (2013.01); *H04L 41/145* (2013.01); *H04W 16/18* (2013.01); *G06F 3/0482* (2013.01)

(58) Field of Classification Search
CPC ....... H04L 41/22; H04L 41/145; H04W 16/18
USPC ......................... 455/446, 44.1, 457, 449, 450
See application file for complete search history.

(56) References Cited

U.S. PATENT DOCUMENTS

| | | | |
|---|---|---|---|
| 2009/0133122 A1* | 5/2009 | Koo | H04L 63/1416 726/23 |
| 2014/0342694 A1* | 11/2014 | Farnsworth | H04M 15/70 455/406 |
| 2020/0204489 A1* | 6/2020 | Pianigiani | H04L 45/64 |

* cited by examiner

*Primary Examiner* — Congvan Tran
(74) *Attorney, Agent, or Firm* — Amin, Turocy & Watson, LLP

(57) ABSTRACT

The described technology is generally directed towards an intent design tool for communication networks. A graphical user interface provided by the intent design tool can include a collection of communication network topology elements and a communication network intent topology design area. Selected communication network topology elements can be placed into the communication network intent topology design area, and connection types between the selected communication network topology elements can also be specified in the communication network intent topology design area, in order to define custom communication network intent topologies.

20 Claims, 10 Drawing Sheets

INTENT DESIGN TOOL FOR WIRELESS COMMUNICATION NETWORKS

TECHNICAL FIELD

The subject application is related to wireless communication systems, and, for example, to an intent design tool for wireless communication networks.

BACKGROUND

Intent based networking (IBN) offers a new approach to planning, designing, and operating wireless communication networks. Prior to IBN, tools were not available to (1) declare a network communication intent and (2) automatically translate the network communication intent into network device configurations. Instead, network operators manually derived network device configurations to meet their communication objectives.

IBN uses intelligent network controller devices to implement policy based abstractions, in the form of network intent specifications. The network controller devices use the network intent specifications to perform automated system wide programming of network elements. IBN furthermore includes gathering and analyzing communication network data to verify that the network is delivering desired intent outcomes. One advantage of IBN is improved fault tolerance: in the event that a specific network device or communication pathway becomes unavailable, the higher level intent specification can nonetheless be achieved or at least approximated using other network devices and communication paths.

IBN can allow network operators to express intent in a declarative and flexible manner, specifying expected networking behavior in the form of higher level priorities and business objectives, rather than in lower level device configurations. Network intent specifications can then be used to generate policies installed into the physical and virtual network infrastructure using network-wide automation. The network can use validation loops to continuously check that the specified intent is achieved.

IBN offers a powerful tool for communication networks, and so technologies are needed to better support IBN deployments. In particular, because IBN allows for myriad different network intent specifications for the myriad different anticipated network use cases, tools are needed to facilitate design and testing of network intent specifications.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
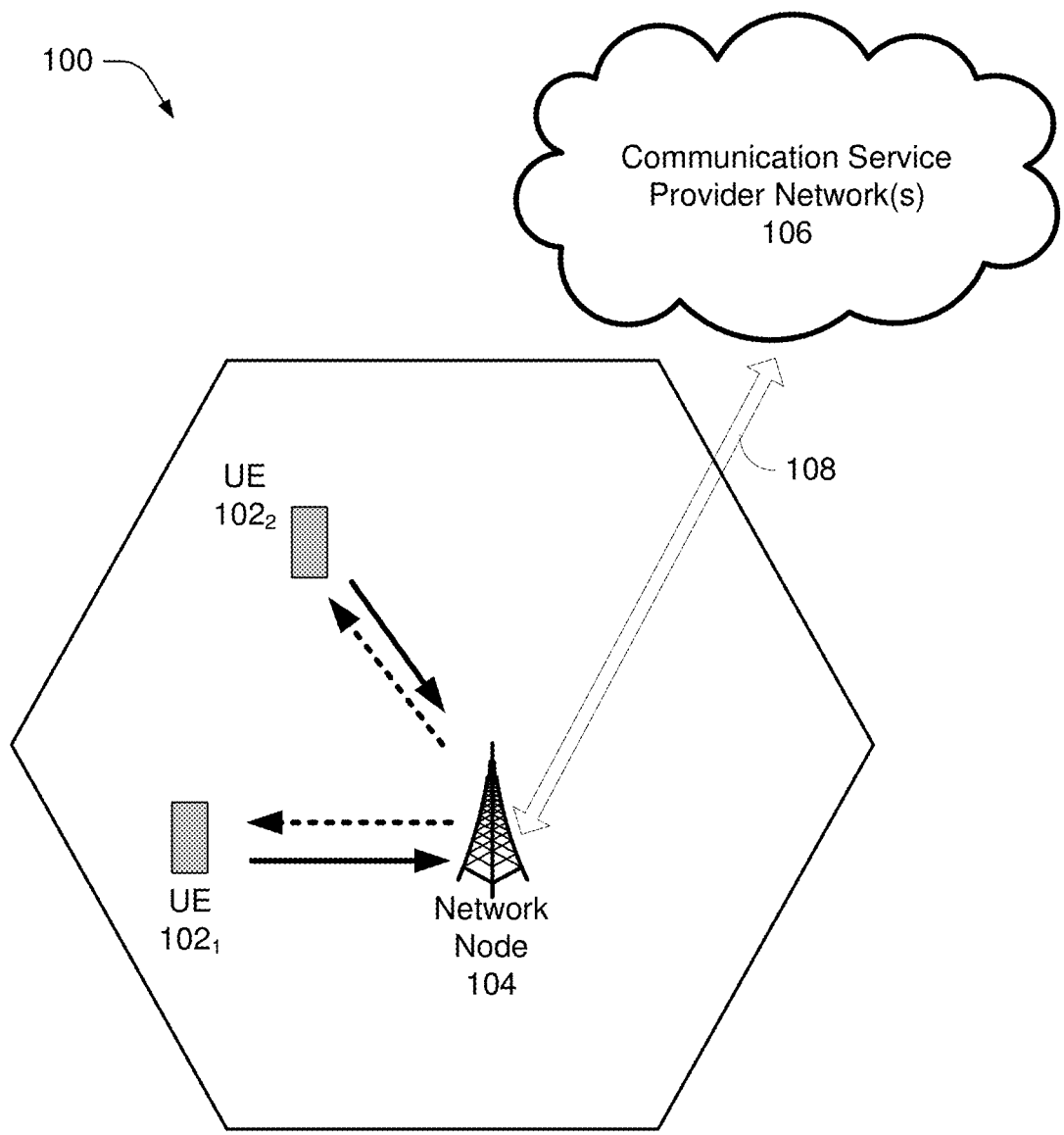
FIG. 1 illustrates a non-limiting example of a wireless communication system in accordance with various aspects and embodiments of the subject disclosure.

One or more aspects of the technology described herein are generally directed towards an intent design tool for communication networks. A collection of communication network topology elements, including for example a radio access network intelligent controller (RIC), a radio unit (RU), a distribution unit (DU), a central unit (CU), and other communication network topology elements, can be displayed in a graphical user interface. The graphical user interface can furthermore provide a communication network intent topology design area. Selected communication network topology elements can be placed into the communication network intent topology design area, and connection types between the selected communication network topology elements can also be specified in the communication network intent topology design area. The selected representations of communication network topology elements and the connection types there between can define a custom communication network intent topology, which can optionally be further refined and tested using the intent design tool. The custom communication network intent topology can comprise a defined communication network pathway usable, e.g., for communications by applications that have been configured to use the custom radio access network intent topology. Further aspects and embodiments of the disclosed technology are described in detail below.

It should be understood that any of the examples and terms used herein are non-limiting. For instance, the examples are based on 5G communications between a user equipment exemplified as a smartphone or the like and network devices; however virtually any communications devices can benefit from the technology described herein, and/or their use in different spectrums can likewise benefit. Thus, any of the embodiments, aspects, concepts, structures, functionalities or examples described herein are non-limiting, and the technology can be used in various ways that provide benefits and advantages in radio communications in general.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

FIG. 1 illustrates a non-limiting example of a wireless communication system 100 in accordance with various aspects and embodiments of the subject disclosure. In one or more embodiments, system 100 can comprise one or more user equipment UEs 1021, 1022, referred to collectively as UEs 102, a network node 104, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, and the like. UEs 102 can also comprise IOT devices that communicate wirelessly.

In various embodiments, system 100 comprises communication service provider network(s) 106 serviced by one or more wireless communication network providers. In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations). Network node 104 can comprise a "base station" and one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
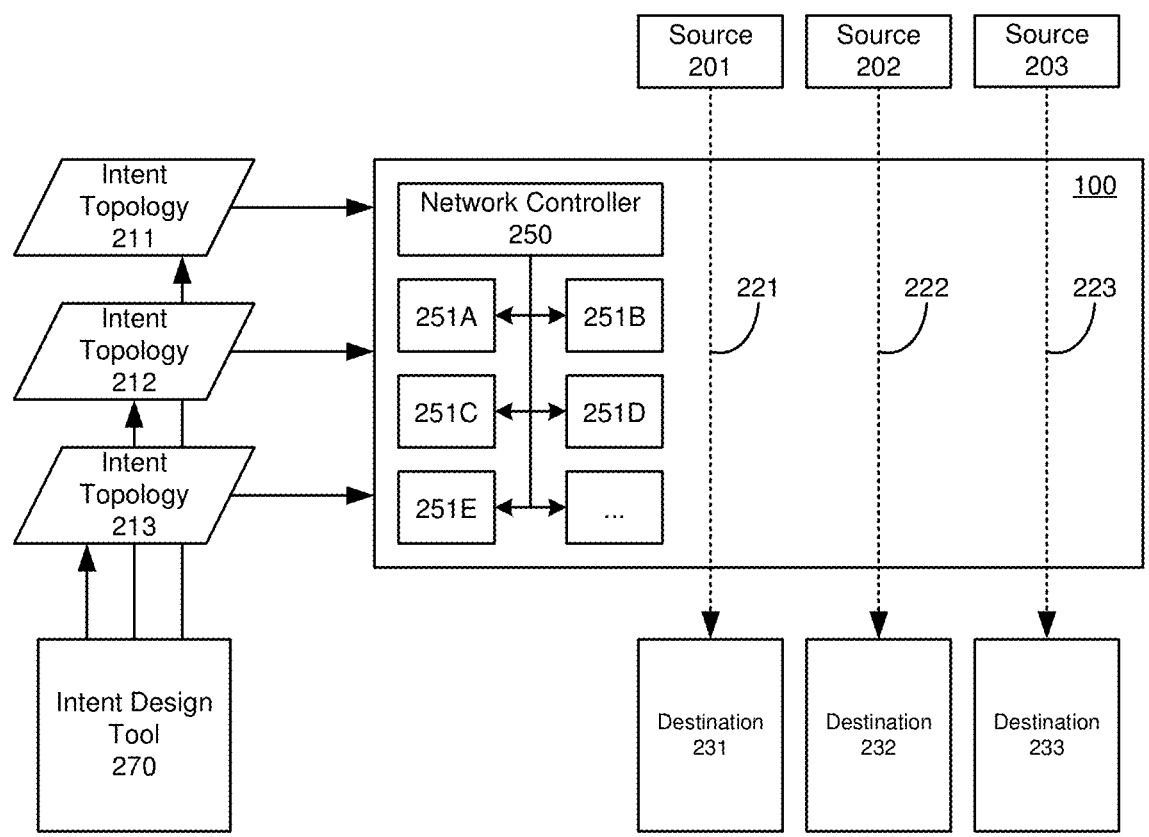
FIG. 2 is a diagram illustrating example design and deployment of network intent topologies into a wireless communication system such as illustrated in FIG. 1, in accordance with various aspects and implementations of the subject disclosure.

FIG. 2 is a diagram illustrating example design and deployment of network intent topologies into a wireless communication system such as illustrated in FIG. 1, in accordance with various aspects and implementations of the subject disclosure. Repetitive description of like elements employed in other embodiments described herein is omitted for sake of brevity. FIG. 2 includes the wireless communication system 100 introduced in FIG. 1. Wireless communication system 100 includes an example network controller 250, various example network resources 251A, 251B, 251C, 251D, 251E, etc., and example communication network pathways 221, 222, and 223. FIG. 2 furthermore includes an intent design tool 270, intent topologies 211, 212, and 213, sources 201, 202, 203, and destinations 231, 232, and 233.

In FIG. 2, the intent design tool 270 can be used to generate intent topologies 211, 212, and 213, as described further herein. The intent topologies 211, 212, and 213 can be provided to wireless communication system 100, and in particular, to network controller 250. The network controller 250 can use the intent topologies 211, 212, and 213 to configure the communication network pathways 221, 222, and 223. For example, the network controller 250 can use intent topology 211 to configure communication network pathway 221, the network controller 250 can use intent topology 212 to configure communication network pathway 222, and the network controller 250 can use intent topology 213 to configure communication network pathway 223.

The different communication network pathways 221, 222, and 223 can include different resources of network resources 251A, 251B, 251C, 251D, 251E. Furthermore, the network controller 250 can configure resources differently in the different communication network pathways 221, 222, and 223.

The wireless communication system 100 can route communications from sources 201, 202, and 203 to corresponding communication network pathways 221, 222, and 223. As a result, communications from different sources 201, 202, and 203 can follow different communication network pathways 221, 222, and 223 to their respective destinations 231, 232, and 233, wherein the different communication network pathways 221, 222, and 223 are defined by the different intent topologies 211, 212, 213.

In some embodiments, sources 201, 202, and 203 can comprise, e.g., applications that have been configured to use custom communication network intent topologies, such as intent topologies 211, 212, and 213. Sources 201, 202, and 203 can also comprise sources of communication types that are classified within wireless communication system 100 as appropriate for handling according to an intent topology of intent topologies 211, 212, and 213.

Figure 3:
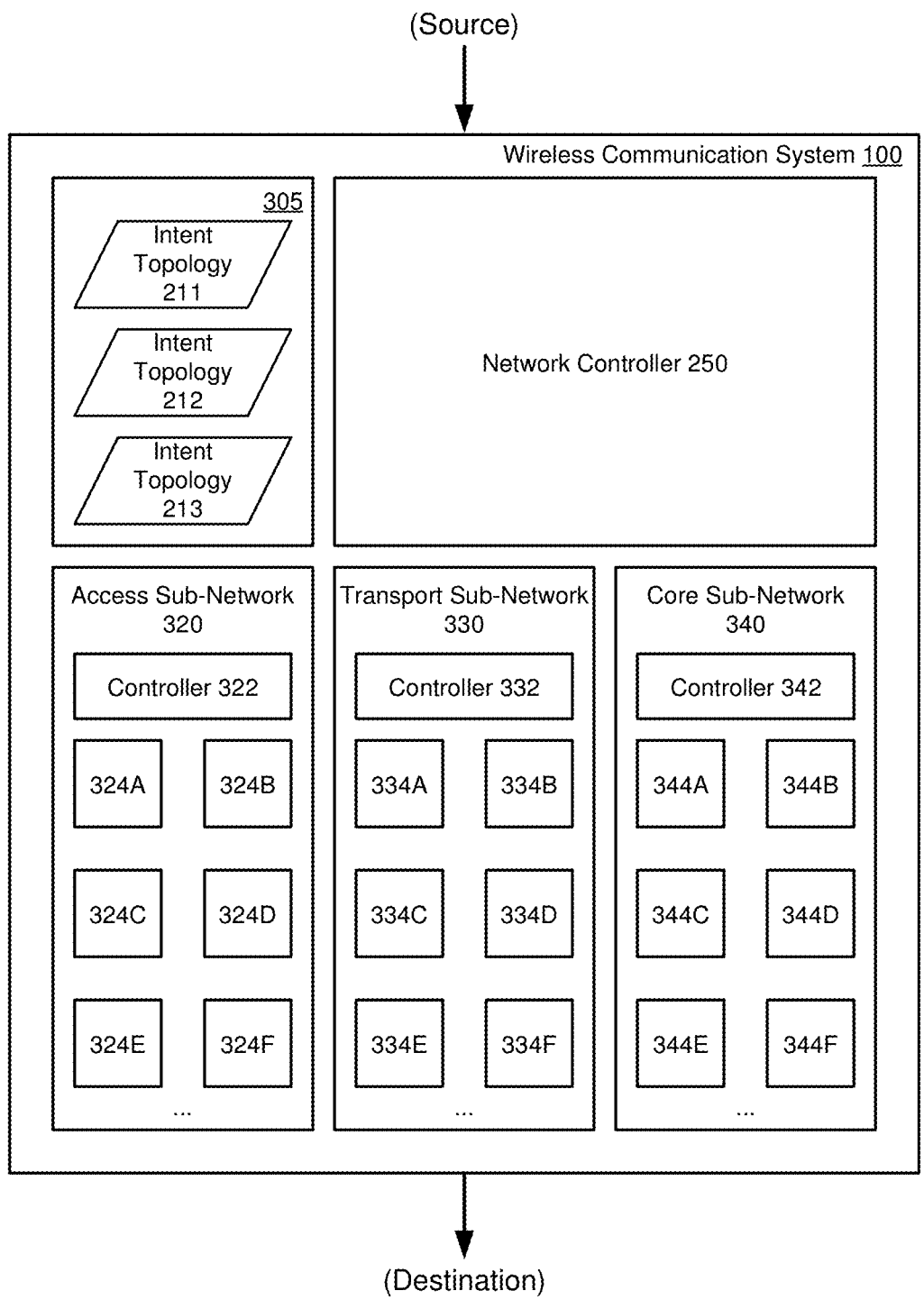
FIG. 3 is a diagram illustrating an example deployment of network intent topologies into a wireless communication system comprising multiple sub-networks, in accordance with various aspects and implementations of the subject disclosure.

FIG. 3 is a diagram illustrating an example deployment of network intent topologies into a wireless communication system comprising multiple sub-networks, in accordance with various aspects and implementations of the subject disclosure. Repetitive description of like elements employed in other embodiments described herein is omitted for sake of brevity. FIG. 3 includes wireless communication system 100, introduced in FIG. 1. Wireless communication system 100 includes network controller 250, an intent topology storage 305, and multiple example sub-networks, including an access sub-network 320, a transport sub-network 330 and a core sub-network 330.

In FIG. 3, the intent topology storage 305 includes intent topologies 211, 212, and 213. Furthermore, each of the sub-networks includes a controller and multiple example sub-network resources. Access sub-network 320 includes controller 322 and resources 324A, 324B, 324C, 324D, 324E, and 324F. Transport sub-network 330 includes controller 332 and resources 334A, 334B, 334C, 334D, 334E, and 334F. Core sub-network 340 includes controller 342 and resources 344A, 344B, 344C, 344D, 344E, and 344F.

In some examples, network controller 250 can retrieve the intent topologies 211, 212, and 213 from intent topology storage 305 to configure the communication network pathways 221, 222, and 223 illustrated in FIG. 2. Network controller 250 can pre-configure a communication network pathway in advance of receiving a communication from a particular source that uses the communication network pathway (e.g., the source illustrated in FIG. 3), or the network controller 250 can configure the communication network pathway in real time or near real time, in response to receiving a communication from a particular source that uses the communication network pathway (e.g., the source illustrated in FIG. 3).

In FIG. 3, network controller 250 can implement a communication network pathway by providing instructions to each of the sub-network controllers 322, 332, 342. The instructions from network controller 250 can comprise high level intent abstractions, or lower level resource configuration instructions. In either case, the sub-network controllers 322, 332, 342 can employ network automation to configure their respective sub-network resources to implement the instructions from the network controller 250. The sub-network controllers 322, 332, 342 can furthermore report respective sub-network information back to network controller 250, so that network controller 250 can compile performance information for intent compliance verification.

Figure 4:
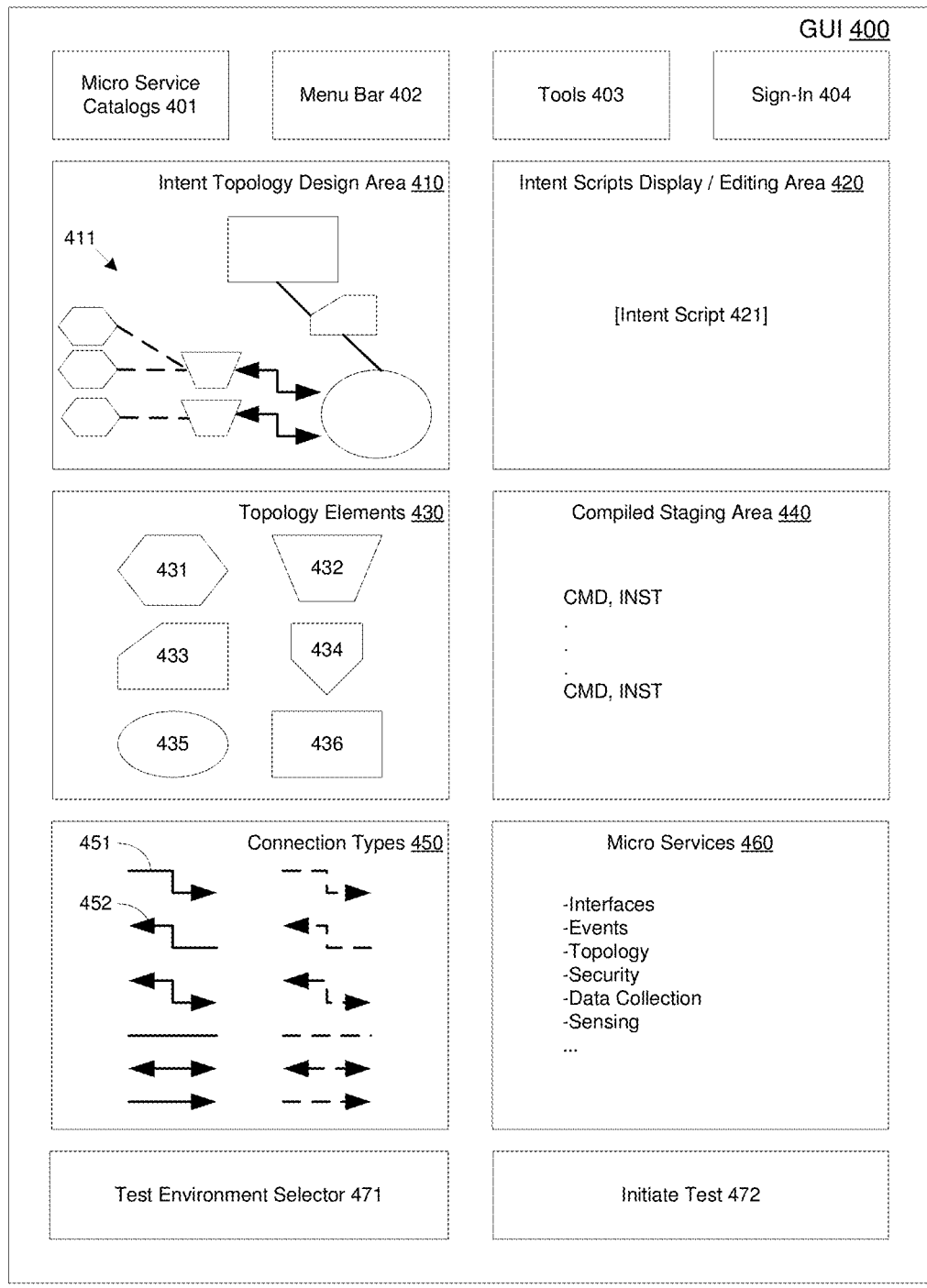
FIG. 4 is a diagram illustrating an example network intent topology design graphical user interface (GUI), in accordance with various aspects and implementations of the subject disclosure.

FIG. 4 is a diagram illustrating an example network intent topology design graphical user interface (GUI), in accordance with various aspects and implementations of the subject disclosure. Repetitive description of like elements employed in other embodiments described herein is omitted for sake of brevity. The example GUI 400 comprises a first set of example GUI elements including micro service catalogs 401, menu bar 402, tools 403 and sign-in 404. The example GUI 400 further comprises a second set of example GUI elements including an intent topology design area 410, an intent scripts display/editing area 420, topology elements 430, compiled staging area 440, connection types 450, and micro services 460. The example GUI 400 further comprises a third set of example GUI elements including test environment selector 471 and initiate test 472.

Figure 6:
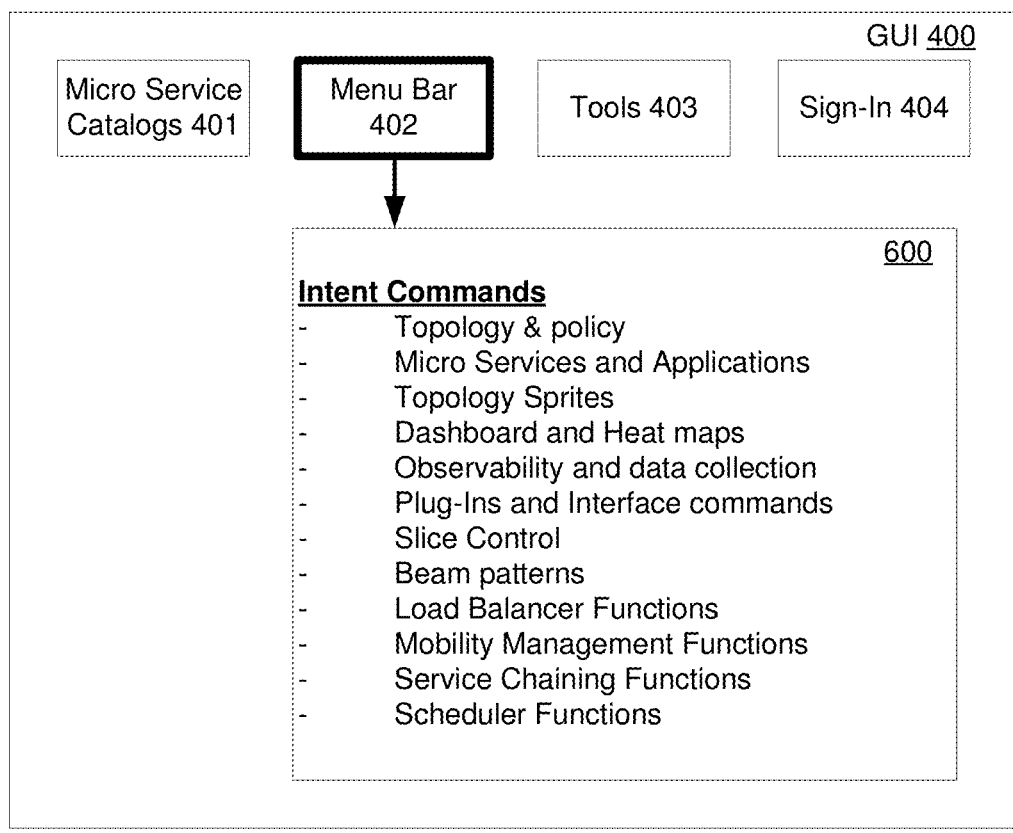
FIG. 6 is a block diagram illustrating example intent commands, in accordance with various aspects and implementations of the subject disclosure.

In an embodiment, micro service catalogs 401 can provide, responsive to selection thereof, a listing of multiple catalogs of micro services available for use in connection with GUI 400. Menu bar 402 can provide, responsive to selection thereof, any of a variety of selectable functions, e.g., sets of intent commands such as illustrated in FIG. 6. Tools 403 can also provide, responsive to selection thereof, any of a variety of selectable functions, e.g., the control commands illustrated in FIG. 7. Sign-in 404 can provide, responsive to selection thereof, a username and password dialog to enable user access to saved intent topology design projects.

In another aspect, intent topology design area 410 can receive a variety of inputs for design of custom communication network intent topologies, such as example custom communication network intent topology 411. The inputs to intent topology design area 410 can comprise, e.g., selected communication network topology elements from among topology elements 430, and selected connection types from among connection types 450. For example, in an embodiment, selected topology elements from among topology elements 430 can be arranged by the user within intent topology design area 410, and connection types from among connection types 450 can also be arranged by the user within intent topology design area 410, in order to specify desired connection types between the selected topology elements.

The topology elements 430 can comprise a collection of various different selectable topology elements 431, 432, 433, 434, 435, 436, etc. Different shapes, colors and/or other visual information can be used to differentiate and identify the different topology elements. In some embodiments, the topology elements 431, 432, 433, 434, 435, 436, etc., can comprise, inter alia, a radio access network intelligent controller (RIC), a radio unit (RU), a distribution unit (DU), a central unit (CU), various interfaces such as an E2 type interface and/or an A1 type interface, and any other communication network topology elements. The topology elements 431, 432, 433, 434, 435, 436, etc., can comprise selectable representations of radio access network (RAN) topology elements, as well as elements from, e.g., access, core and backhaul sub-networks. A user of GUI 400 can optionally drag and drop any of selectable topology elements 431, 432, 433, 434, 435, 436, etc., as well as any of connection types 451, 452, etc., and micro services from micro services 460, into intent topology design area 410, and the user can attach the selected elements to the custom communication network intent topology 411.

Similarly, connection types 450 can comprise a collection of various different selectable connection types 451, 452, etc. Different shapes, colors and/or other visual information can be used to differentiate and identify the different connection types. In some embodiments, the connection types 451, 452, etc., can comprise, inter alia, open front-haul type connections, F1 type connections, etc. Connection types can also employ arrows to indicate direction of communications, or bidirectional communications, via the various different connection types. The connection types 451, 452, etc., can comprise selectable representations of RAN topology elements, as well as connection types for use in connection with access, core and backhaul sub-networks.

While topology elements 430 and connection types 450 are shown as different collections of elements in FIG. 4, it will be appreciated that embodiments can optionally combine topology elements 430 and connection types 450 into a unified collection.

In some embodiments, respective topology elements 431, 432, 433, 434, 435, 436, etc., can be associated with respective intent scripts. Selection of a topology element such as 431, within topology elements 430 or within intent topology design area 410, can cause the GUI 400 to display a corresponding intent script in the intent scripts display/editing area 420. The intent script editing area 420 can receive edit inputs specifying intent script edits, and the GUI can save the intent script edits for the corresponding topology element such as 431.

In some embodiments, micro services 460 can comprise a collection of micro services, such as but not limited to micro services from the illustrated example classes of micro services, including interfaces, events, topology, security, data collection, and sensing micro services. The micro services displayed in micro services 460 can optionally include micro services accessed via micro service catalogs 401. Selected micro services from micro services 460 can optionally be provided as inputs to intent topology design area 410, in order to specify selected micro services and locations for the selected micro services within the custom communication network intent topology 411.

Compiled staging area 440 is another optional element of GUI 400. Compiled staging area 440 can comprise, e.g., a compiled view of the custom communication network intent topology 411 under design in the intent topology design area 410. In some embodiments, compiled staging area 440 can receive inputs and modifications which can be reflected in the intent topology design area 410, and vice-versa.

Figure 5:
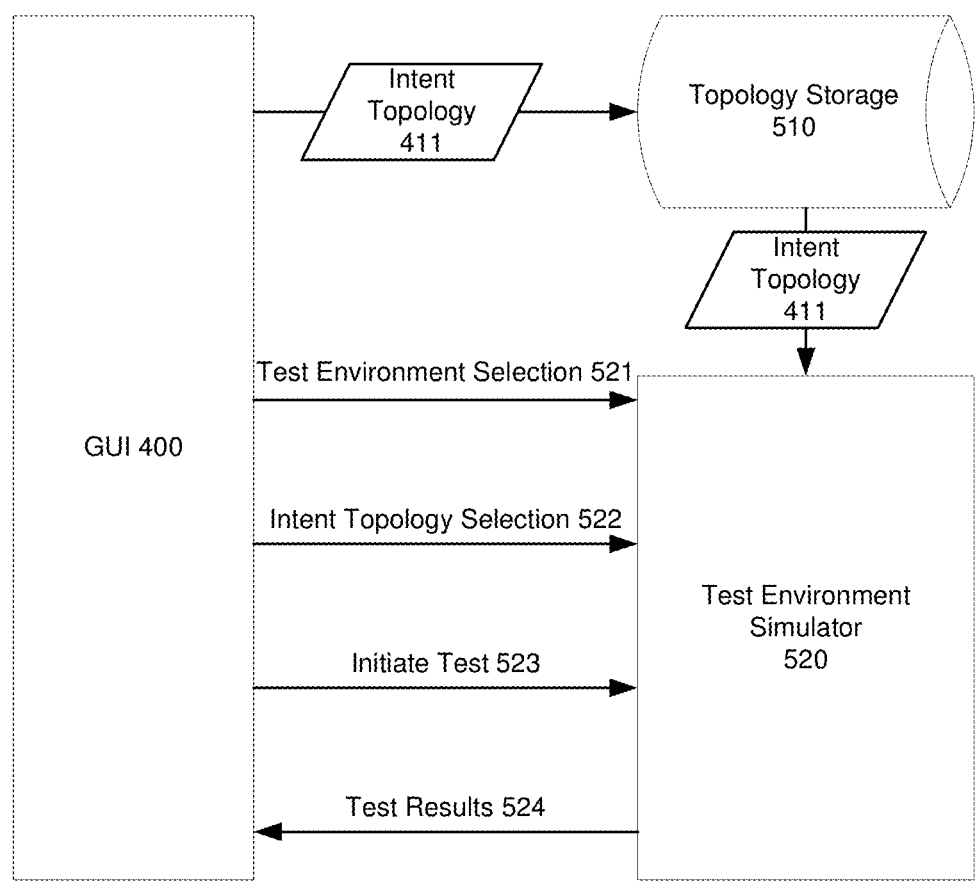
FIG. 5 is a block diagram illustrating example test environment selection and test of custom communication network intent topologies, in accordance with various aspects and implementations of the subject disclosure.

In a further aspect, the custom communication network intent topology 411 designed in intent topology design area 410 can be tested using test environment selector 471 and initiate test 472. In an example implementation, test environment selector 471 can display, in response to selection thereof, a list of selectable runtime test environments. A test environment from the list of selectable test environments can be selected for testing the custom communication network intent topology 411. The list of selectable test environments can include multiple networking environments, optionally including environments with different physical infrastructures and resources, different software and hardware resources and capabilities, and furthermore optionally subject to different conditions such as traffic flows and congestion. In some embodiments, the list of selectable test environments can comprise environments which can be simulated by a test environment simulator such as illustrated in FIG. 5.

In response to a selection of initiate test 472, the GUI 400 can initiate a test of the custom communication network intent topology 411 within a test environment selected via test environment selector 471. Test results can optionally be provided back to GUI 400 for review and analysis, as described in connection with FIG. 5.

Using the GUI 400, an unlimited number of different custom communication network intent topologies, such as custom communication network intent topology 411, can be designed. The different designed intent topologies can be tested, saved, and optionally deployed to network communication systems, e.g., as intent topologies 211, 212, and 213 illustrated in FIG. 2 and FIG. 3. The different designed intent topologies can include, e.g., custom mobility control, custom security configurations, custom slice definitions, custom load balancing, custom scheduling, custom connectivity, custom power control, and/or custom edge services as appropriate for applications that have been configured to use the different designed intent topologies.

In some embodiments, GUI 400 can be provided by a network operator, e.g., by the network operator hosting GUI 400 at one or more network operator devices. GUI 400 can be optionally accessed by the network operator and/or by network customers desiring custom intent topologies for customer applications that run on the network operator's network. GUI 400 can therefore enable "external" design of network intent topologies. GUI 400 can in some embodiments limit the topology elements, connection types, and/or test environments visible to external users, e.g., for network security purposes or based on user privileges.

In some aspects, FIG. 4 illustrates an advanced graphical integrated approach to design wireless centric services from a set of private and public catalogs of micro services. The micro services can be referred to as "sprites". Each sprite can be, e.g., dragged and dropped into intent topology design area 410, and programmed for its provided interfaces, functional APIs, and capabilities. Sprites, when organized and chained together can form a service, an application or an intent. Thus GUI 400 can enable a self-service programmable service edge, programmable by the end users.

Traditionally, corporate applications existed within well-defined perimeters, e.g., within on-premises data-centers, and were relatively easily secured using network-layer controls. Traffic was classified as north-south for outside company premises, or east-west for within company premises. Remote access virtual private networks (VPNs) were used to secure north-south traffic, and network firewalls were used to secure east-west traffic. More recently however, network technologies are moving to a more perimeter-free world, where applications are strewn across multiple clouds, utilizing various types of transport such as 4G, 5G, and wire. Network technologies have become highly dynamic and chatty, and are accessed by employees from all over the globe, using diverse mobile devices. This has created an a demand for customized network topologies and services and favors intent frameworks that provide instant access and programmable SLA, functions, costs and risks for enterprise, corporations, and network operators.

Embodiments of FIG. 4 can therefore provide RAN graphical representations of radio environments, where customers or network providers can stage, design, and program radio edge access solutions. FIG. 4 optionally enables end users to adaptively apply RAN services to their needs. For example, they can design an intent topology where end user mobile edge computing (MEC) services are handled by the highest ranking methods and algorithms associated to each cell or region.

In view of the recent industry trend toward open radio access network (ORAN) deployments, a network intent topology design tool such as illustrated in FIG. 4 can provide a framework that enables self-service intent topology staging, design and pre-testing collaboratively with the network operator. Furthermore, micro services and primitives related to RAN from third party application developers can be conceptualized and injected into micro service catalogs for use in intent topology design.

FIG. 5 is a block diagram illustrating example test environment selection and test of custom communication network intent topologies, in accordance with various aspects and implementations of the subject disclosure. Repetitive description of like elements employed in other embodiments described herein is omitted for sake of brevity. FIG. 5 includes GUI 400, topology storage 510, and test environment simulator 520. Custom communication network intent topology 411 (referred to as intent topology 411) is illustrated as being stored in topology storage 510 by GUI 400, and intent topology 411 is retrieved from topology storage 510 by test environment simulator 520 for testing. Furthermore, a variety of example interactions between GUI 400 and test environment simulator 520 are illustrated, including test environment selection 521, intent topology selection 522, initiate test 523, and test results 524.

In FIG. 5, in response to a user command received at GUI 400, GUI 400 can save intent topology 411 to topology storage 510. Topology storage 510 can optionally comprise multiple other intent topologies designed via GUI 400, which can optionally be securely stored and made available to authorized users for viewing via GUI 400, as well as further editing and testing.

In response to a test environment selection, e.g., via test environment selector 471 illustrated in FIG. 4, GUI 400 can provide test environment selection 521, comprising an identification of the selected test environment, to test environment simulator 520. In response to receiving test environment selection 521, test environment simulator 520 can set up a simulated test environment comprising, e.g., a virtual environment comprising simulated components of the selected test environment, optionally subject to network conditions as specified via test environment selector 471.

Intent topology selection 522 can comprise, e.g., an identification of an intent topology to be tested, e.g., intent topology selection 522 can identify intent topology 411 for testing. In some embodiments, GUI 400 can provide intent topology selection 522 to test environment simulator 520 along with test environment selection 521. For example, intent topology selection 522 can identify an intent topology loaded in intent topology design area 410 at the time of test environment selection via test environment selector 471. In some embodiments, GUI 400 can provide intent topology selection 522 to test environment simulator 520 along with the initiate test 523 command. For example, intent topology selection 522 can identify an intent topology loaded in intent topology design area 410 at the time of initiating a test via initiate test 472. In response to receiving intent topology selection 522, test environment simulator 520 can retrieve the identified intent topology, e.g., intent topology 411, from topology storage 510.

The initiate test 523 command can comprise an instruction to proceed with a test of an intent topology, e.g., intent topology 411 identified via intent topology selection 522, in a test environment identified via test environment selection

521. GUI 400 can provide the initiate test 523 command to test environment simulator 520 in response to user selection of initiate test 472 in FIG. 4. In response to receiving the initiate test 523 command, test environment simulator 520 can perform one or more test actions in order to test the intent topology 411 within the identified test environment. For example, test environment simulator 520 can send different types of communications through the intent topology 411 and test environment simulator 520 can measure performance, cost, security, latency, errors, and any other metrics as may be desired. The measured metrics can be reported back to GUI 400 as test results 524. In response to receiving test results 524, GUI 400 can provide, e.g., a test results viewing area (not shown in FIG. 4) to display the test results 524.

FIG. 6 is a block diagram illustrating intent commands, in accordance with various aspects and implementations of the subject disclosure. FIG. 6 includes the GUI 400 introduced in FIG. 4 and the first set of example GUI elements, namely micro service catalogs 401, menu bar 402, tools 403 and sign-in 404. Menu bar 402 is highlighted to indicate user selection thereof. Intent commands 600 can be displayed in response to selection of menu bar 402.

Various example intent commands, intent command categories, and corresponding tools and objects are displayed within intent commands 600. These include topology and policy, micro services and applications, topology sprites, dashboard and heat maps, observability and data collection, plug-ins and interface commands, slice control, beam patterns, load balancer functions, mobility management functions, service chaining functions, and scheduler functions.

The illustrated intent commands 600 can comprise RIC intent commands. Intent commands 600 can make available certain capabilities that can be hosted/executed by a RIC. The RIC can provide a powerful real-time, low latency, high data volume computing platform, hosted in a network cloud. RIC can have many capabilities that can be used to create novel services. These capabilities can have complex API's, and aspects of this disclosure make these capabilities available encapsulated as "sprites". Uses can then combine various capabilities/sprites graphically/visually rather than writing programs/scripts in Python or some other language. Sprites can include anything a service provider deems useful and thus intent commands 600 can comprise an evolving/changing set of objects.

With regard to the topology and policy intent commands, topology refers to a network/graph of various network elements. Policy refers to business/design rules. Policy can dictate what type of topology to use (e.g., a load balancer may need to have at least dual redundancy).

With regard to the micro services and applications, applications can include a collection of integrated software modules(s) that perform business functions. An "online augmented reality/virtual reality (AR/VR) multiplayer game" is an example of an application. The application can comprise of many parts or modules, such as: find/connect users, check user credentials, display game canvas, game engine, 3D rendering, transcode to HD stream, etc. These different modules comprise pieces of software and can be deployed as "a running process or service" in a server (often but necessarily in a cloud). The current design and deployment approach is not to create a massive "running process/service" but to create many smaller/loosely-coupled/networked services, called micro services.

With regard to the topology sprites, these can comprise graphical icons that represent potentially more complex topology elements. The term "topology" refers to a network/graph model of a network elements connected together. For example, a load balancer can comprise redundant routers behind a firewall. This configuration can be captured in one reusable design, such as a load balancer topology model. The design can be represented by a topology sprite. In some embodiments, a user can drag/resize/drop/place/connect a topology sprite via a mouse or touch.

With regard to the dashboard, this can include, e.g., multiple tools and a palette where the user can draw/create new objects. The heat maps can comprise graphical representations of data where the individual values contained in a matrix are represented as colors.

With regard to observability and data collection, observability sprites/modules can allow access to/read/display certain data or state of a system, while data collection sprites/modules can allow users to request that certain data be collected on their behalf and on their request.

With regard to slice control, 5G slices are a feature of a 5G networks and services. A slice control sprite/module can provide access to slice control capabilities. With regard to beam patterns, beam control/beam pattern is a feature of 5G. Controlling/managing a beam involves specifying various parameters. Beam pattern sprites and modules provide access to beam control features and an ability to specify parameters.

While FIG. 6 illustrates display of intent commands 600 in response to selection of menu bar 402, it will be appreciated that intent commands 600 can alternatively be accessed via other elements of GUI 400. Furthermore, the various example intent commands within intent commands 600 need not necessarily be grouped together—they can instead be accessed through a variety of different elements of GUI 400 as may be appropriate for some embodiments.

Figure 7:
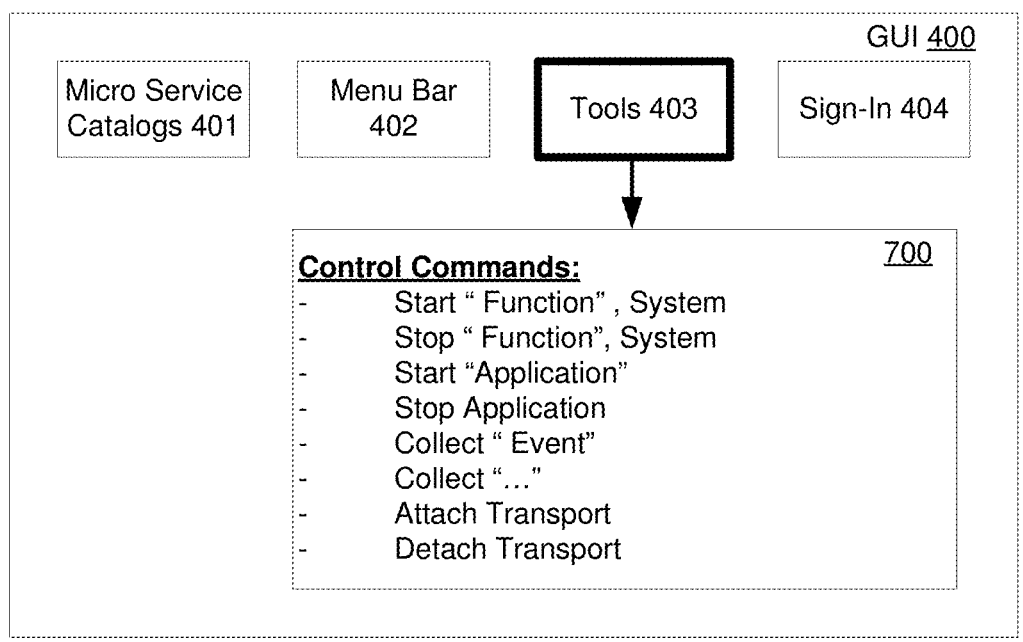
FIG. 7 is a block diagram illustrating example control commands, in accordance with various aspects and implementations of the subject disclosure.

FIG. 7 is a block diagram illustrating control commands, in accordance with various aspects and implementations of the subject disclosure. FIG. 7 includes the GUI 400 introduced in FIG. 4 and the first set of example GUI elements, namely micro service catalogs 401, menu bar 402, tools 403 and sign-in 404. Tools 403 is highlighted to indicate user selection thereof. Control commands 700 can be displayed in response to selection of tools 403.

Various example control commands are displayed within control commands 700. These include: start "function", system; stop "function", system; start "application"; stop "application"; collect event; collect " . . . "; attach transport; and detach transport.

In some embodiments, the intent framework disclosed herein can support both the design and management of services having custom intent topologies. The intent commands 600 illustrated in FIG. 6 support custom intent topology design. Once a custom intent topology is designed and deployed, it can be controlled and managed using control commands 700. Control commands 700 can also be viewed as management commands.

The start "function", system command can start a service using a custom communication network intent topology 411. The stop "function", system command can stop the service using the custom communication network intent topology 411. The start "application" command can start an application using the custom communication network intent topology 411. The stop "application" command can stop an application using the custom communication network intent topology 411. The collect event command, and other collect commands can collect, monitor, and/or track certain events/data during the execution of a service using the custom communication network intent topology 411. The commands can be used on behalf of a service provider, e.g., for events/data beyond original custom communication network intent topology 411 design specifications.

While FIG. 7 illustrates display of control commands 700 in response to selection of tools 403, it will be appreciated that control commands 700 can alternatively be accessed via other elements of GUI 400. Furthermore, the various example control commands within control commands 700 need not necessarily be grouped together—they can instead be accessed through a variety of different elements of GUI 400 as may be appropriate for some embodiments.

Figure 8:
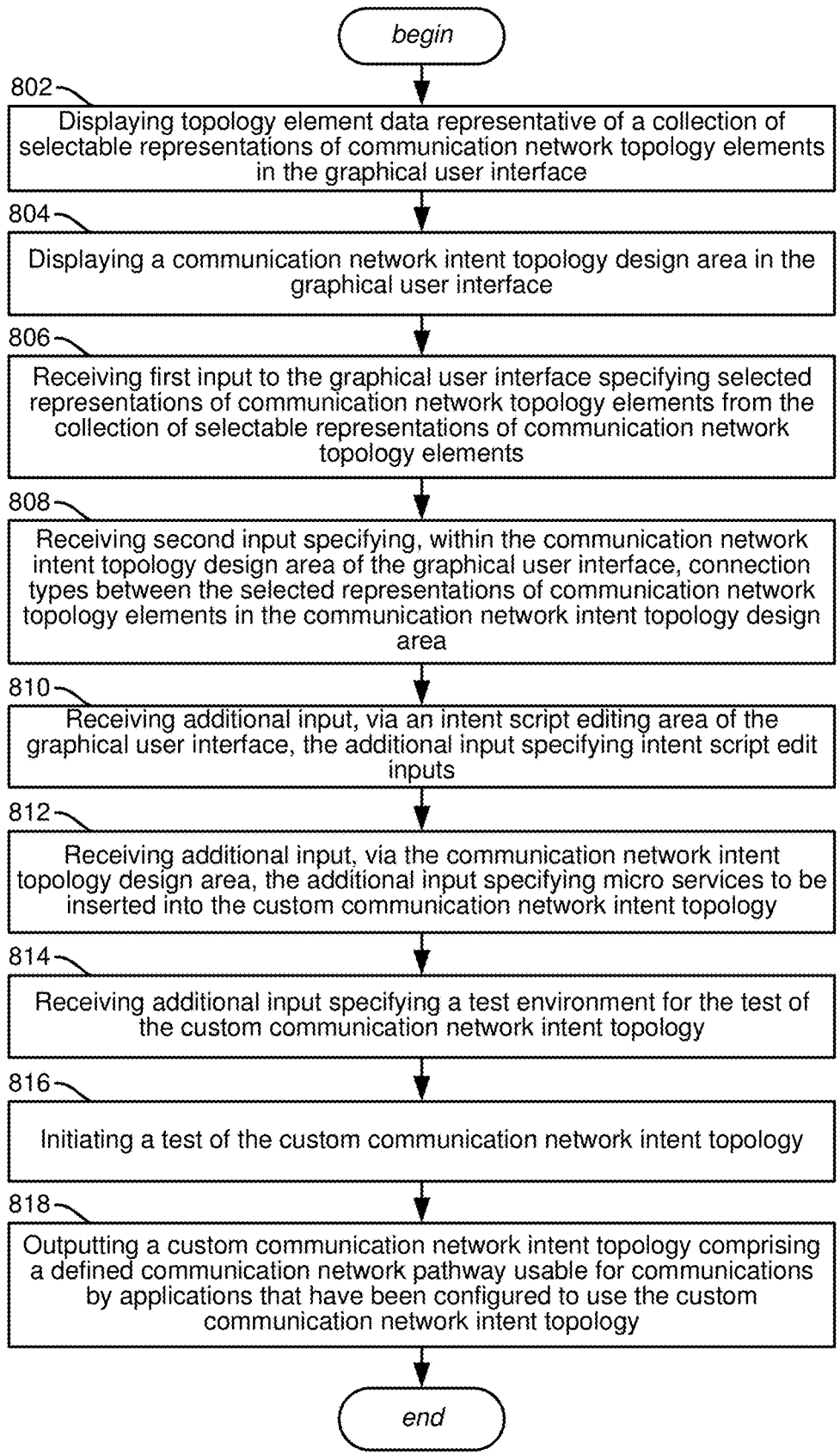
FIG. 8 is a flow diagram representing example operations of an intent design tool, in accordance with various aspects and implementations of the subject disclosure.

One or more aspects, such as implemented in a machine-readable storage medium, comprising executable instructions that, when executed by a processor, facilitate performance of operations, are represented in FIG. 8. FIG. 8 is a flow diagram representing example operations of an intent design tool, in accordance with various aspects and implementations of the subject disclosure. While the operations are illustrated in an example sequence, the operations can be eliminated, combined, or re-ordered in some embodiments.

Figure 10:
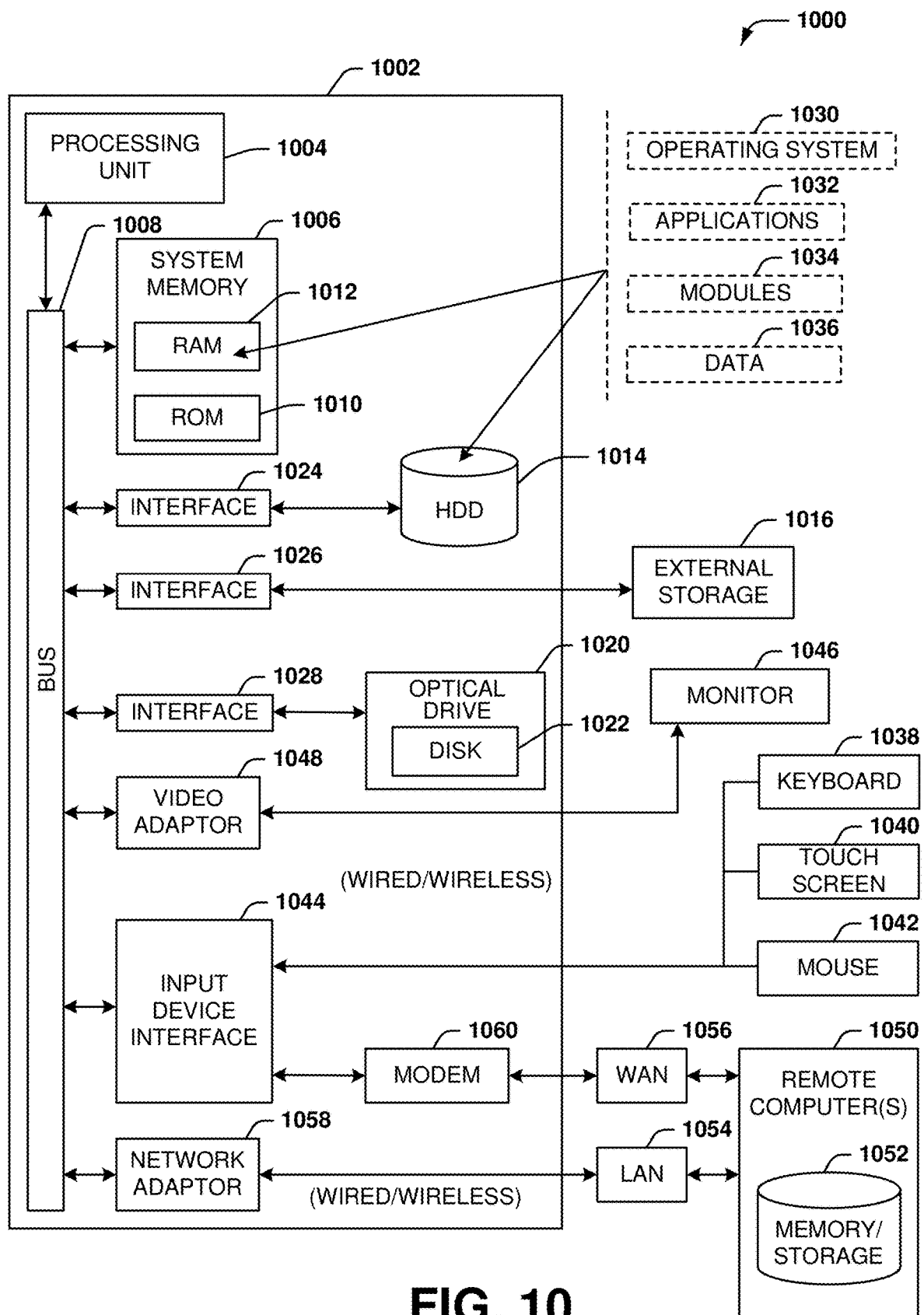
FIG. 10 illustrates a suitable computing environment in which the various aspects of this disclosure can be implemented, in accordance with various aspects and implementations of the subject disclosure.

Example operations comprise operation 802, which represents displaying topology element data representative of a collection of selectable representations of communication network topology elements in the graphical user interface. For example, a computing device such as illustrated in FIG. 10 can display a GUI 400 such as illustrated in FIG. 4. GUI 400 comprises topology elements 430, which in turn includes topology element data representative of a collection of selectable representations of communication network topology elements. The topology elements 430 can include selectable representations of RAN topology elements, and topology elements 430 can optionally further include additional topology elements as well.

Example operations comprise operation 804, which represents displaying a communication network intent topology design area in the graphical user interface. For example, a computing device such as illustrated in FIG. 10 can display a GUI 400 such as illustrated in FIG. 4. GUI 400 comprises intent topology design area 410.

Example operations comprise operation 806, which represents receiving first input to the graphical user interface specifying selected representations of communication network topology elements from the collection of selectable representations of communication network topology elements. For example, a computing device such as illustrated in FIG. 10 can receive, via intent topology design area 410 in GUI 400, first inputs to the GUI 400 specifying topology element selections. Any desired topology elements of 431, 432, 433, 434, 435, 436, etc. can be dragged and dropped or otherwise selected by a user of GUI 400 for inclusion in a custom communication network intent topology 411 constructed in intent topology design area 410.

Example operations comprise operation 808, which represents receiving second input specifying, within the communication network intent topology design area of the graphical user interface, connection types between the selected representations of communication network topology elements in the communication network intent topology design area. For example, a computing device such as illustrated in FIG. 10 can receive, via intent topology design area 410 in GUI 400, second inputs to the GUI 400 specifying connection types between the topology elements selected at operation 806. Any desired connection types of 451, 452, etc. can be dragged and dropped or otherwise selected by a user of GUI 400 for inclusion in a custom communication network intent topology constructed in intent topology design area 410. The user can further attach the connection types between topology elements selected at operation 806.

Example operations comprise operation 810, which represents receiving an additional input, via an intent script editing area of the graphical user interface, the additional input specifying intent script edit inputs. For example, a computing device such as illustrated in FIG. 10 can receive, via intent scripts display/editing area 420 in GUI 400, additional inputs specifying intent script edit inputs. In some embodiments, intent scripts display/editing area 420 can display an intent script for a topology element selected within topology elements 430 or for a topology element selected within intent topology design area 410. The displayed intent script can be edited via intent scripts display/editing area 420. The additional input at block 810 may be referred to as a third input, although the terms "first input", "second input", and "third input" should not be construed as implying an order of inputs.

Example operations comprise operation 812, which represents receiving an additional input, via the communication network intent topology design area, the additional input specifying micro services to be inserted into the custom communication network intent topology. For example, a computing device such as illustrated in FIG. 10 can receive, via intent topology design area 410 in GUI 400, additional inputs specifying micro services to be inserted into a custom communication network intent topology designed in intent topology design area 410. Any desired micro services of micro services 460 can be dragged and dropped or otherwise selected by a user of GUI 400 for inclusion in a custom communication network intent topology. The micro services can be situated at desired locations within the custom communication network intent topology. The additional input at block 812 may be referred to as a third input, although the terms "first input", "second input", and "third input" should not be construed as implying an order of inputs.

Example operations comprise operation 814, which represents receiving an additional input specifying a test environment for the test of the custom communication network intent topology. For example, a computing device such as illustrated in FIG. 10 can receive, via test environment selector 471, the additional input specifying a test environment for the test of the custom communication network intent topology loaded in intent topology design area 410. The additional input at block 814 may be referred to as a third input, although the terms "first input", "second input", and "third input" should not be construed as implying an order of inputs.

Example operations comprise operation 816, which represents initiating a test of the custom communication network intent topology. For example, a computing device such as illustrated in FIG. 10 can initiate a test of the custom communication network intent topology loaded in intent topology design area 410, in response to a user selection of initiate test 472. The computing device can run the test in a simulated test environment configured according to the custom communication network intent topology designed via GUI 400, as described in connection with FIG. 5.

Example operations comprise operation 818, which represents outputting a custom communication network intent topology comprising a defined communication network pathway usable for communications by applications that have been configured to use the custom communication network intent topology. For example, a computing device such as illustrated in FIG. 10 can store, deploy, or otherwise output a custom communication network intent topology designed via the intent topology design area 410. When a custom communication network intent topology is ready for deployment, it can be deployed for example as illustrated in FIG. 3, and applications can be configured to use the custom communication network intent topology. The custom communication network intent topology can comprise, e.g., a custom mobility control, a custom security configuration, a custom slice definition, a custom load balancing, a custom scheduling, a custom connectivity, a custom power control, and/or a custom edge service as desired by the intent topology designer.

Figure 9:
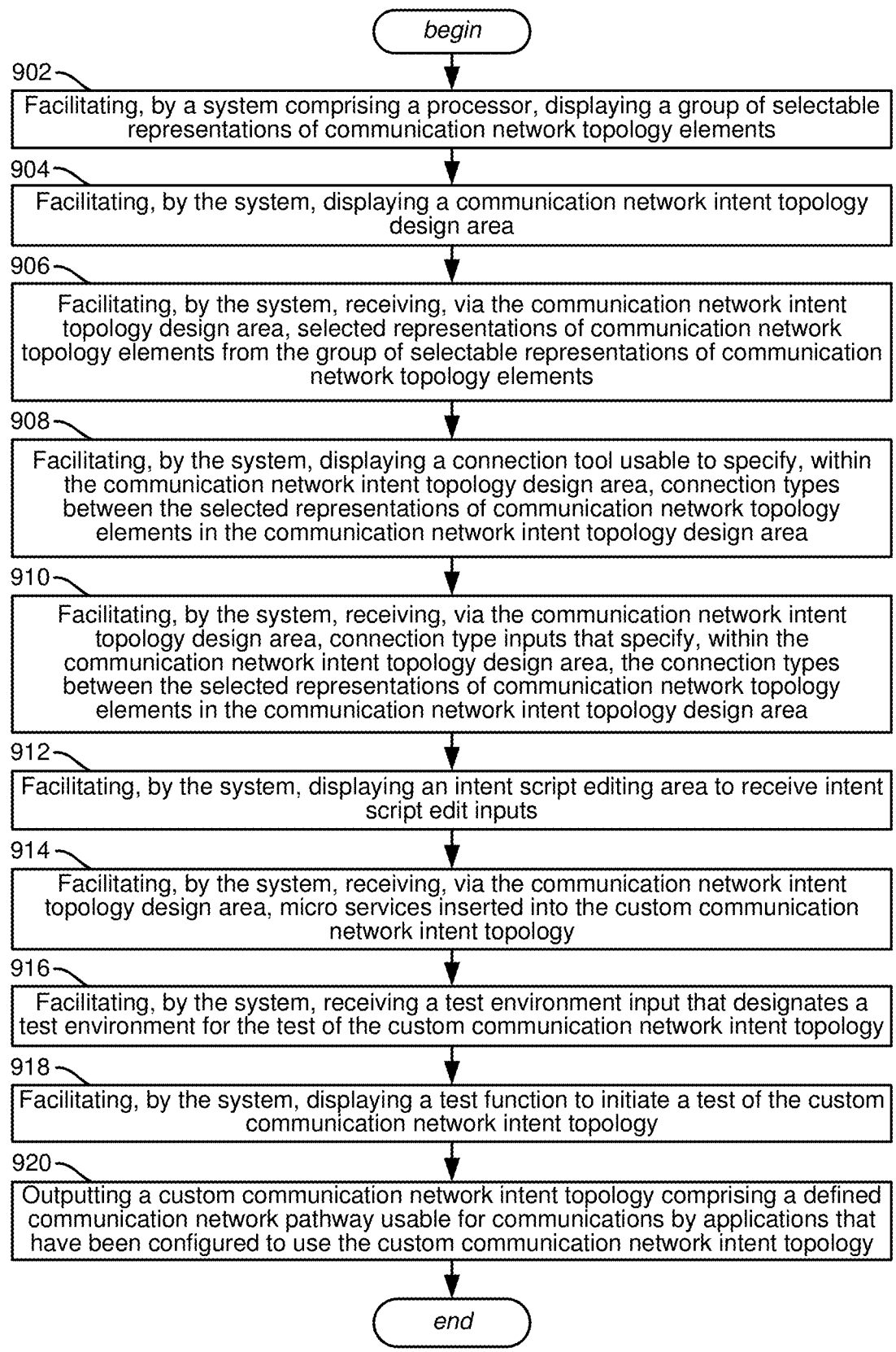
FIG. 9 is a flow diagram representing alternative example operations of an intent design tool, in accordance with various aspects and implementations of the subject disclosure.

One or more aspects, such as implemented in a machine-readable storage medium, comprising executable instructions that, when executed by a processor, facilitate performance of operations, are represented in FIG. 9. FIG. 9 is a flow diagram representing example alternative example operations of an intent design tool, in accordance with various aspects and implementations of the subject disclosure. While the operations are illustrated in an example sequence, the operations can be eliminated, combined, or re-ordered in some embodiments.

Example operations comprise operation 902, which represents facilitating, by a system comprising a processor, displaying a group of selectable representations of communication network topology elements. For example, a computing device such as illustrated in FIG. 10 can facilitate display of GUI 400, illustrated in FIG. 4, the GUI 400 comprising topology elements 430, wherein topology elements 430 comprises a group of selectable representations 431, 432, 433, 434, 435, 436, etc., of communication network topology elements.

Example operations comprise operation 904, which represents facilitating, by the system, displaying a communication network intent topology design area. For example, a computing device such as illustrated in FIG. 10 can facilitate display of GUI 400, illustrated in FIG. 4, the GUI 400 comprising intent topology design area 410.

Example operations comprise operation 906, which represents facilitating, by the system, receiving, via the communication network intent topology design area, selected representations of communication network topology elements from the group of selectable representations of communication network topology elements. For example, a computing device such as illustrated in FIG. 10 can facilitate receiving, via intent topology design area 410, selected topology elements from among topology elements 431, 432, 433, 434, 435, 436, etc.

Example operations comprise operation 908, which represents facilitating, by the system, displaying a connection tool usable to specify, within the communication network intent topology design area, connection types between the selected representations of communication network topology elements in the communication network intent topology design area. For example, a computing device such as illustrated in FIG. 10 can facilitate displaying a connection tool such as connection types 450 usable to specify, within the intent topology design area 410, connection types such as 451, 452, etc. between the topology elements selected at operation 906. A variety of other connection tool embodiments are possible as will be appreciated.

Example operations comprise operation 910, which represents facilitating, by the system, receiving, via the communication network intent topology design area, connection type inputs that specify, within the communication network intent topology design area, the connection types between the selected representations of communication network topology elements in the communication network intent topology design area. For example, a computing device such as illustrated in FIG. 10 can facilitate receiving, via intent topology design area 410, connection type inputs, e.g., selections from among connection types 450 which can be dragged or otherwise moved into intent topology design area 410. The selections from among connection types 450 can be attached to topology elements in the intent topology design area 410 in order to specify connections between specific elements.

Example operations comprise operation 912, which represents facilitating, by the system, displaying an intent script editing area to receive intent script edit inputs. For example, a computing device such as illustrated in FIG. 10 can facilitate displaying intent scripts display/editing area 420 to display an intent script for any of the topology elements in topology elements 430, and to receive intent script edit inputs.

Example operations comprise operation 914, which represents facilitating, by the system, receiving, via the communication network intent topology design area, micro services inserted into the custom communication network intent topology. For example, a computing device such as illustrated in FIG. 10 can facilitate receiving, via the intent topology design area 410, micro services from among micro services 460. Micro services can be inserted into the custom communication network intent topology designed in intent topology design area 410, for example by dragging micro services from micro services 460 into intent topology design area 410, and specifying any connection details to attach a micro service to the custom communication network intent topology. Example micro services comprise a micro service to measure traffic flow, a micro service to collect data, and a micro service to initiate events.

Example operations comprise operation 916, which represents facilitating, by the system, receiving a test environment input that designates a test environment for the test of the custom communication network intent topology. For example, a computing device such as illustrated in FIG. 10 can facilitate receiving a test environment input through test environment selector 471, wherein the test environment input designates a test environment for the test of the custom communication network intent topology 411.

Example operations comprise operation 918, which represents facilitating, by the system, displaying a test function to initiate a test of the custom communication network intent topology. For example, a computing device such as illustrated in FIG. 10 can facilitate displaying a test function, such as initiate test 472, to initiate a simulated test of the custom communication network intent topology 411.

Example operations comprise operation 920, which represents outputting a custom communication network intent topology comprising a defined communication network pathway usable for communications by applications that have been configured to use the custom communication network intent topology. For example, a computing device such as illustrated in FIG. 10 can save, deploy to a network, or otherwise output custom communication network intent topology 411, wherein custom communication network intent topology 411 comprises a defined communication network pathway usable for communications by applications that have been configured to use the custom communication network intent topology 411.

Custom communication network intent topology 411 can optionally comprise or enable a custom cost profile associated with processing communications by applications, a custom service level associated with processing communications by applications, a custom security level associated with processing communications by applications, and/or a custom execution environment associated with processing communications by applications.

In some embodiments, the computing device that implements the method illustrated in FIG. 9 can be provided by a communications service provider, and accessed by a designer of the custom communication network intent topology 411, which may be, e.g., a customer of the communications service provider, in order for the designer to customize service provided (to the designer/customer) by the communications service provider. In other embodiments, the computing device that implements the method illustrated in FIG. 9 can be used internally at a communication service provider. In still further embodiments, the computing device that implements the method illustrated in FIG. 9 can be unassociated with any communication service provider, and can design network intent topologies for export to communication service providers.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations that display a graphical user interface, the operations comprising:
   displaying topology element data representative of a collection of selectable representations of communication network topology elements in the graphical user interface;
   displaying a communication network intent topology design area in the graphical user interface;
   receiving first input to the graphical user interface specifying selected representations of communication network topology elements from the collection of selectable representations of communication network topology elements; and
   receiving second input specifying, within the communication network intent topology design area of the graphical user interface, connection types between the selected representations of communication network topology elements in the communication network intent topology design area,
   wherein the selected representations of communication network topology elements and the connection types between the selected representations of communication network topology elements in the communication network intent topology design area define custom topology data representative of a custom communication network intent topology comprising a defined communication network pathway usable for communications by applications that have been configured to use the custom communication network intent topology.

2. The system of claim 1, wherein the collection of selectable representations of communication network topology elements comprises selectable representations of radio access network topology elements.

3. The system of claim 1, wherein a selectable representation of a communication network topology element of the collection of selectable representations of communication network topology elements is associated with an intent script, and wherein the operations further comprise receiving third input, via an intent script editing area of the graphical user interface, the third input specifying intent script edit inputs.

4. The system of claim 1, wherein the operations further comprise receiving a third input via the communication network intent topology design area, the third input specifying micro services to be inserted into the custom communication network intent topology.

5. The system of claim 1, wherein the operations further comprise initiating a test of the custom communication network intent topology.

6. The system of claim 5, wherein the operations further comprise receiving a third input specifying a test environment for the test of the custom communication network intent topology.

7. The system of claim 1, wherein the custom communication network intent topology comprises at least one of a custom mobility control, a custom security configuration, a custom slice definition, a custom load balancing, a custom scheduling, a custom connectivity, a custom power control, or a custom edge service.

8. A method, comprising:
facilitating, by a system comprising a processor, displaying a group of selectable representations of communication network topology elements;
facilitating, by the system, displaying a communication network intent topology design area;
facilitating, by the system, receiving, via the communication network intent topology design area, selected representations of communication network topology elements from the group of selectable representations of communication network topology elements;
facilitating, by the system, displaying a connection tool usable to specify, within the communication network intent topology design area, connection types between the selected representations of communication network topology elements in the communication network intent topology design area;
facilitating, by the system, receiving, via the communication network intent topology design area, connection type inputs that specify, within the communication network intent topology design area, the connection types between the selected representations of communication network topology elements in the communication network intent topology design area,
wherein the selected representations of communication network topology elements and the specified connection types between the selected representations of communication network topology elements in the communication network intent topology design area define a custom communication network intent topology comprising an intended communication network pathway for communications by applications that use the custom communication network intent topology.

9. The method of claim 8, wherein the system is provided by a communications service provider and accessed by a designer of the custom communication network intent topology to customize service provided by the communications service provider.

10. The method of claim 8, wherein a selectable representation of a communication network topology element of the group of selectable representations of communication network topology elements is associated with an intent script, and further comprising displaying, by the system, an intent script editing area to receive intent script edit inputs.

11. The method of claim 8, further comprising facilitating, by the system, receiving, via the communication network intent topology design area, micro services inserted into the custom communication network intent topology.

12. The method of claim 11, wherein the micro services comprise at least one of a micro service to measure traffic flow, a micro service to collect data, and a micro service to initiate events.

13. The method of claim 12, further comprising:
facilitating, by the system, displaying a test function to initiate a test of the custom communication network intent topology; and
facilitating, by the system, receiving a test environment input that designates a test environment for the test of the custom communication network intent topology.

14. The method of claim 8, wherein the custom communication network intent topology comprises a programmable mobility primitive selected from a group comprising: mobility control, security configuration, slice definition, load balancing, scheduling, connectivity, power control, and edge service.

15. A device, comprising:
a processor; and
a memory that stores executable instructions that, when executed by the processor, facilitate performance of operations, the operations comprising:
displaying selectable representations of communication network topology elements and a connection tool to specify connection types between the communication network topology elements;
displaying a communication network topology design area; and
receiving, via the communication network topology design area, selected representations of communication network topology elements from the selectable representations of communication network topology elements, and connection type inputs that specify connection types between the selected representations of communication network topology elements,
wherein the selected representations of communication network topology elements and the specified connection types between the selected representations of communication network topology elements in the communication network topology design area define a custom communication network topology for processing communications by applications that have been configured to use the custom communication network topology.

16. The device of claim 15, wherein the custom communication network topology comprises a custom cost profile associated with processing the communications by the applications, a custom service level associated with processing the communications by the applications, a custom security level associated with processing the communications by the applications, or a custom execution environment associated with processing the communications by the applications.

17. The device of claim 15, wherein a selectable representation of a communication network topology element of the selectable representations of communication network topology elements is associated with an intent script, and wherein the operations further comprise displaying an intent script editing area and receiving intent script edit inputs.

18. The device of claim 15, wherein the operations further comprise receiving, via the communication network topology design area, micro service data representative of a micro service inserted into the custom communication network topology, wherein the micro service comprises a micro service to measure traffic flow, a micro service to collect data, or a micro service to initiate events.

19. The device of claim 15, wherein the operations further comprise displaying a test function that performs a test of the custom communication network topology.

20. The device of claim 15, wherein the operations further comprise associating a test run time environment with the custom communication network topology.

* * * * *